Figure 1:
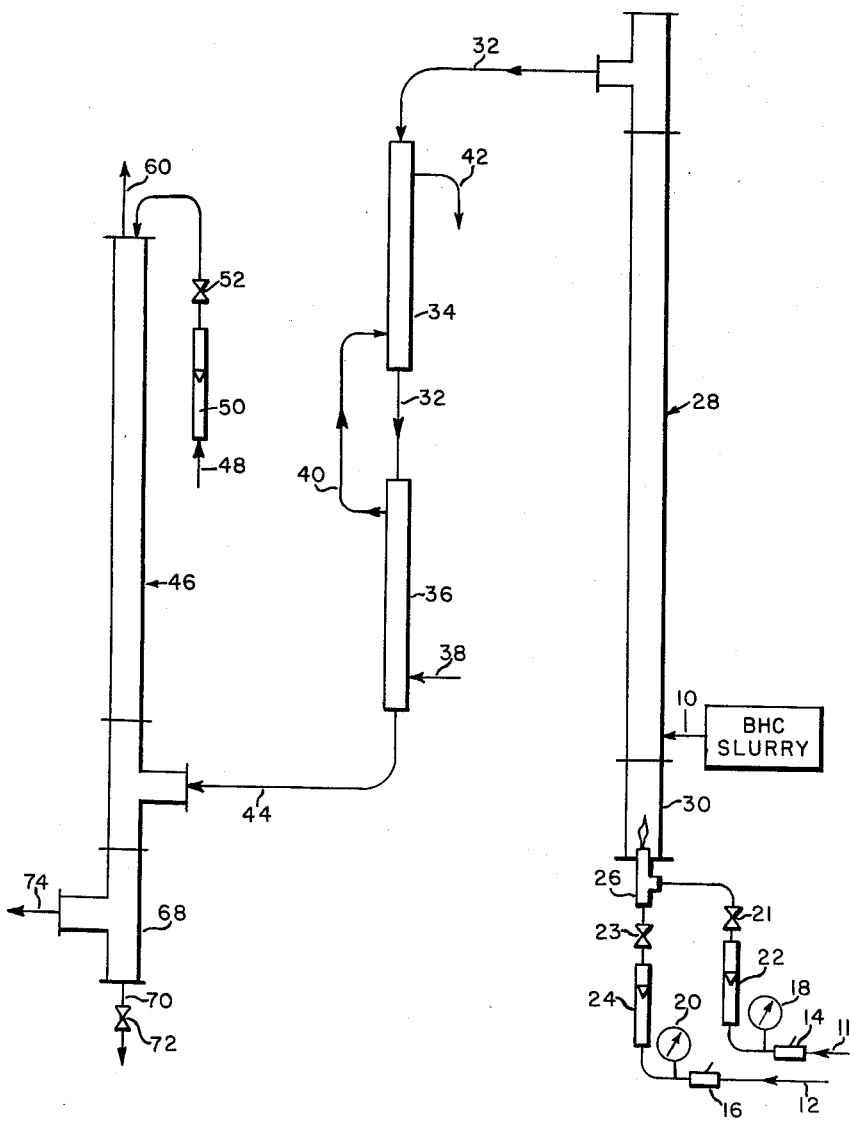

INVENTOR
ELI ZINN
JAMES J. LUKES

United States Patent Office 2,914,574
Patented Nov. 24, 1959

2,914,574

DEHYDROCHLORINATION OF BENZENE HEXACHLORIDE

Eli Zinn, Painesville, and James J. Lukes, Euclid, Ohio, assignors to Diamond Alkali Company, Cleveland, Ohio, a corporation of Delaware Application October 5, 1956, Serial No. 614,216

3 Claims. (Cl. 260—650)

This invention relates to the vapor phase dehydrochlorination of benzene hexachloride in a fluidized catalyst bed reaction zone.

Up to this time various proposals have been made for the dehydrochlorination of benzene hexachloride isomers, especially those isomers not useful as insecticides, i.e., alpha, beta and other relatively biologically inert isomers, and having little activity or utility in other applications. These isomers heretofore have frequently been an operating burden for which no practicable relief has been available. Such isomers frequently contain a substantial and often predominant proportion of alpha isomer although minor amounts of other isomers such as beta isomer, delta, epsilon also may be included.

The expression "benzene hexachloride" as used herein is intended generically and hence includes not only the total chlorination mixture comprising benzene hexachloride as produced on chlorination of benzene, but also specific isomers or mixtures thereof such as so-called "alpha-beta cake" which generally compresses the residue from the isolation of a pure or enriched gamma isomer-containing material.

Prior proposals for the dehydrochlorination of benzene hexachloride to obtain useful materials therefrom such as various chlorinated benzenes, e.g., trichlorobenzene, dichlorobenzene, and monochlorobenzene, as well as mixtures thereof, have been concerned largely with the use of specific catalysts to achieve a predominant amount of one isomer over another, or the formation of one type of chlorinated product. These prior proposals have been concerned also with the application of the specific product obtained.

The prior art processes frequently have required the use of relatively costly procedures, or have limited utility imposed by the specific reaction conditions which must be maintained, or the type of product resulting. Hence, the search has continued for new and improved processes suitable for converting large quantities of heretofore undesirable and substantially useless isomers of benzene hexachloride formed and heretofore discarded in the preparation and isolation of the biologically active gamma benzene hexachloride.

Accordingly, it is to the avoidance of the difficulties heretofore encountered, and to the provision of a new and improved method for treating benzene hexachloride to obtain useful products therefrom that the present invention is directed.

A further object of the invention is to provide a new and improved process for dehydrochlorinating benzene hexachloride to obtain useful products therefrom.

These and other objects and advantages of the invention will appear more fully from the following description thereof.

Generally, the present invention is concerned with vapor phase dehydrochlorination of benzene hexachloride in the presence of a fluidized catalyst. More specifically, the present invention contemplates the vapor phase dehydrochlorination of benzene hexachloride in a fluidized catalyst bed reaction zone maintained at a temperature high enough substantially completely to vaporize the benzene hexachloride therein.

It is contemplated that various dehydrochlorination catalysts can be employed in the reaction. The expression "fluidized catalyst bed reaction zone" as used throughout the specification and claims is intended to refer to the reaction media in which the benzene hexachloride is vaporized and dehydrochlorinated while the term "dehydrochlorination catalyst," as used throughout the specification and claims, is intended to refer to a substance added specifically for the purpose of facilitating dehydrochlorination and may or may not be the same material making up the fluidized catalyst bed reaction zone.

Figure 2:
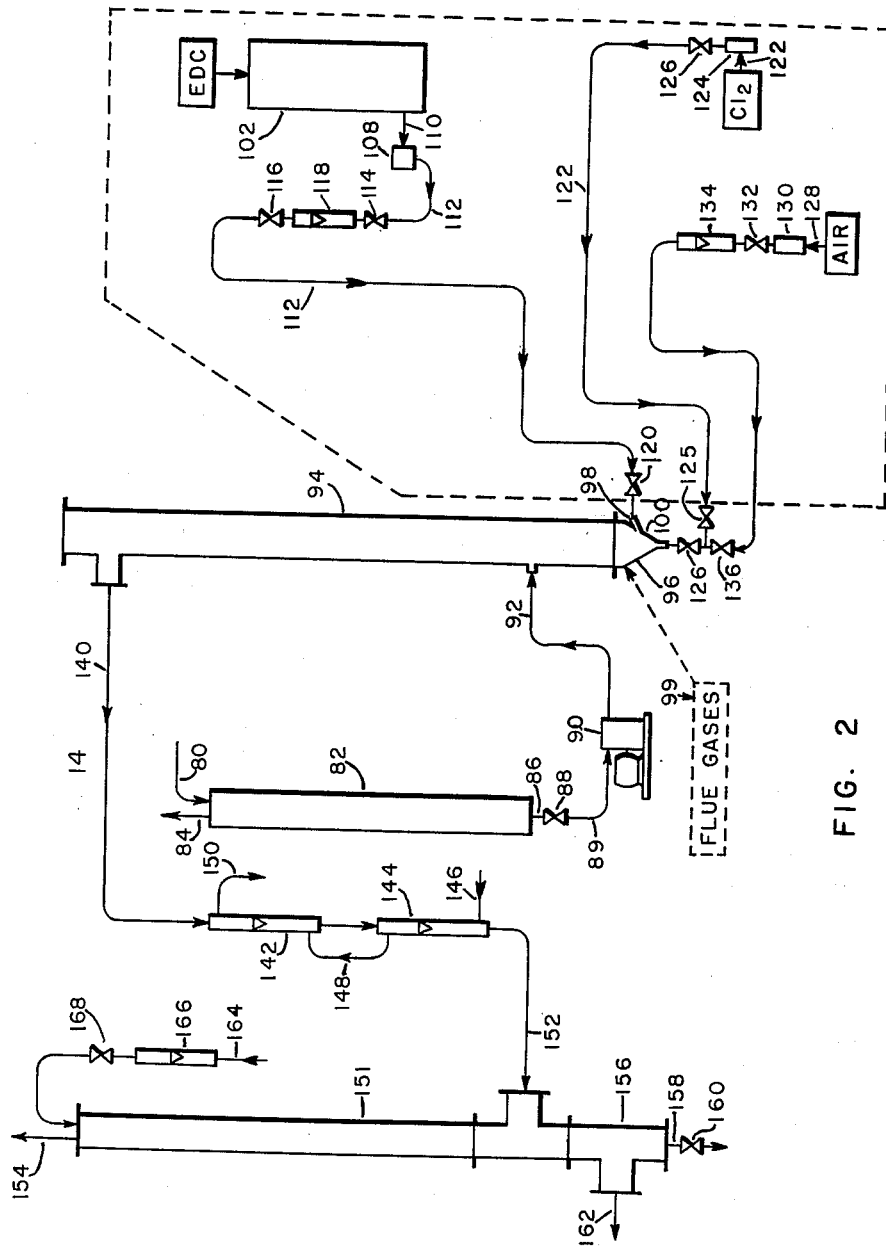

Referring now briefly to the accompanying drawings:

Fig. 1 illustrates one embodiment of the process as a simplified schematic flow diagram; and Fig. 2 is a schematic flow diagram illustrating another embodiment of the process of this invention.

The vapor phase dehydrochlorination of benzene hexachloride in accordance with this invention may be carried out in a fluidized catalyst bed reaction zone wherein the reaction zone comprises one or a mixture of different types of finely-divided, particulate materials. Illustrative of suitable materials are various heat resistant, inert substances such as sand, silicon carbide, clay, diatomaceous earth, carbon, synthetic aluminum silicates, synthetic silica-alumina gel, alumina gel, hydrate of natural aluminum-magnesium-silicate known as "fuller's earth," and the like.

The presently preferred catalyst is a silica-alumina catalyst preferably having a bulk density within the range from about 50 to 100 lbs. per cubic foot and a particle size sufficient to insure proper fluidity under the conditions of reaction. Typically practicable particle size distributions are:

| Percent: | Mesh |
|---|---|
| 10–20 | +100 |
| 40–60 | +200 |
| 10–20 | +325 |
| 2–10 | −325 |

Generally the surface structure of the catalyst should be reasonably smooth as contrasted to sharp or irregularly surfaced particles.

More specifically, the presently preferred type of catalyst is one comprising a finely-divided material containing a predominant amount of silica ($SiO_2$) and a minor amount of alumina ($Al_2O_3$) and, in some instances, trace amounts of other metals such as copper, sodium, magnesium, calcium, chromium, nickel, iron, vanadium, titanium, and manganese. The following are specific illustrative examples of preferred types of catalysts:

|  | A | B | C | D | E | F |
|---|---|---|---|---|---|---|
| Bulk Density, Lbs./cu. ft. |  |  | 60.2 | 58.5 | 56.9 | 53.2 |
| Silica_____percent__ | 95.5 | 95.7 | 85.9 | 85.7 | 93 |  |
| Alumina_____do____ | 4.2 | 3.7 | 14.0 | 14.0 | 0.6 |  |
| Copper_____do____ |  | 0.004 |  |  | 0.001 |  |
| Sodium_____do____ |  | None |  |  | Less than 0.05 |  |
| Magnesium_____do____ |  | 0.004 |  |  | 0.002–0.02 |  |
| Calcium_____do____ |  | 0.0004 |  |  | 0.002–0.02 |  |
| Chromium_____do____ |  | 0.0006 |  |  | 0.004 |  |
| Iron as Fe₂O₃_____do____ | 0.10 | 0.29 | 0.42 | 0.018 | 0.2 |  |
| Nickel_____do____ |  | 0.03 |  |  | 0.006 |  |
| Vanadium_____do____ |  | 0.015 |  |  | 0.008 |  |
| Titanium_____do____ |  | 0.003 |  |  | 0.004 |  |
| Manganese_____do____ |  | None |  |  | 0.004 |  |

The temperature to be maintained in the fluidized catalyst bed reaction zone should be at least sufficient to effect substantially complete vaporization of benzene hexachloride introduced therein. On the other hand, the maximum temperature to be used is dictated in part at least by economic conditions, taking into consideration the equipment used and the specific products desired. In general it has been found that excellent results are achieved when the temperature in the fluidized catalyst bed reaction zone is maintained within the range from about 300 to 550° C.

The residence time of the benezene hexachloride in the reaction zone is, of course, dictated by the temperature, nature of the fluidized catalyst, dehydrochlorination catalyst if used, products desired, and the like. In general, it is desired to provide sufficient residence time under the conditions employed to achieve dehydrochlorination of benzene hexachloride to yield a product containing a major proportion of trichlorobenzene.

In maintaining the fluidity of the catalyst bed it is preferred at present to utilize flue gas or other combustion gas introduced under pressure as a means of maintaining catalyst fluidity and also as a source of heat. Hence, it will be appreciated that it is a preferred practice of this invention to utilize directly the combustion gases obtained from the burning of natural gas, or other flue gases at a high temperature and in a sufficient quantity and at a pressure to maintain the desired catalyst bed fluidity.

Alternatively, it is also contemplated by this invention that the fluidity of the catalyst bed may be maintained by using inert gases such as nitrogen and that heat be applied by some other means, as for example, via electrical heating devices such as resistant heaters located within or without the reactor.

The use of a catalyst to facilitate dehydrochlorination generally is desirable. Various materials are useful in this connection; at present it is preferred to employ metallic compounds such as ferric chloride, ammonium chloride, nickel chloride, alkali metal carbonates, e.g., Na₂CO₃, or alkaline earth metal oxides, e.g., CaO, and the like.

In practice, the present invention contemplates three methods of introducing the benzene hexachloride into the fluidized catalyst bed reaction zone. These include (1) slurrying benzene hexachloride, e.g., in trichlorobenzene, and introducing the resultant slurry directly into the reaction zone, (2) the use of molten benzene hexachloride as feed and (3) the introduction of molten benzene hexachloride together with chlorine and ethylene dichloride to utilize as at least a partial heat source the exothermic reaction occurring between ethylene dichloride and chlorine.

Referring now more particularly to the drawings, Fig. 1 illustrates schematically the practice of the present invention utilizing as a feed to the reactor a slurry of benzene hexachloride in trichlorobenzene and the use of hot flue gas to maintain catalyst bed fluidity and as a heat source. As shown in Fig. 1, a benzene hexachloride slurry, natural gas and air are introduced through lines 10, 11 and 12, respectively, their flow being regulated by pressure gauges 18 and 20, respectively, rotameters 22 and 24, and valves 21 and 23, respectively. The gas and air are combined at 26 and ignited in a so-called "burner box" 30 at the lower end of a fluidized catalyst bed reactor indicated generally at 28. In the reactor 28, which preferably is nickel or nickel-clad material, there is provided a fluidized catalyst bed maintained in a fluid condition by the uprising combustion gases from the burner box 30. From the top of the reactor the hot gases and reaction products leave via line 32 and are passed successively through two condensers 34 and 36 which are provided with cooling water via lines 38, 40, and 42. From the condensers via line 44 the cooled gases and products are passed to a water scrubber, indicated generally at 46.

The scrubber 46 typically is packed with ceramic Raschig rings or other suitable inert packing, and is provided with a downwardly flowing water stream via line 48, the water flow being regulated and controlled by rotameter 50 and valve 52. Inert gases are vented through line 60.

At the bottom of the scrubber 46 is provided a T-shaped separator 68 in the lower portion of which organic product is collected and removed via line 70 which is controlled by valve 72 in a decanting operation. Hydrochloric acid formed in the reaction is decanted off through line 74.

In starting up the equipment, it is convenient during the warming up of the apparatus and establishing of the fluidized catalyst bed reaction zone to use air as a fluidizing medium, although, of course, flue gases also may be used initially. As pointed out previously, inert gases, heated or not, if sufficient heat is provided in some other manner, also may be utilized.

Reference is now made to Figure 2 which illustrates in a schematic flow sheet another embodiment of the process of this invention. In this embodiment, especially adapted for the introduction of benzene hexachloride in a molten form, the so-called, for example, "40% BHC" containing approximately 40% gamma isomer, or "alpha-beta" cake containing only minor amounts of gamma isomer and a predominant amount of alpha isomer. The benzene hexachloride is introduced via line 80 into a melter 82 heated by any suitable means (not shown), for example, electrical resistance heaters, to melt the BHC. The melter 82 is provided with a vent 84. At the bottom of the melter, molten benzene hexachloride is removed via line 86 controlled by valve 88. Pump 90 introduces the molten benzene hexachloride via line 92 into the bottom of a fluid catalyst bed reactor 94. The bottom of the reactor 94 is provided with a generally conically-shaped element 96 which can be provided with, alternatively or in combination in certain instances, (1) an ethylene dichloride feed inlet 98 and a chlorine and air feed inlet 100, or (2) a flue gas supply indicated generally at 99. When it is desired to utilize the exothermic heat of reaction characterizing the combination of ethylene dichloride and chlorine, ethylene dichloride is supplied from a feed tank indicated at 102. From the tank ethylene dichloride passes through a porous stone filter 108 via line 110 and then via line 112 controlled by valves 114, and 120, and rotameter 118.

Chlorine is introduced via line 122, its pressure being controlled by pressure regulator 124, and valve 126. Air is introduced via line 128 and its pressure is controlled by pressure regulator 130, valve 132, rotameter 134, and valve 136.

The reactor 94 contains the fluidized catalyst which is maintained in a fluidized condition maintained by the uprising gases. From the top of the reactor 94 the gaseous reaction products are removed via line 140 and passed through condensers 142 and 144 which are cooled by water supplied through lines 146, and 148, and discharged through line 150. From the condensers the products enter a water scrubber 151 through line 152. Inerts from the scrubber are vented through line 154 at the top of the scrubber. From the bottom of the scrubber 151, organic product is removed in a decanting operation from the T-shaped section 156 via line 158 which is controlled by valve 160. Muriatic acid is removed via line 162. The water scrubber is filled with inert packing such as Raschig rings and is provided with water through line 164, the water flow being regulated by a rotameter 166 and valve 168.

In order that those skilled in the art may more completely understand the present invention and the preferred methods by which the same may be carried into effect, the following specific examples are offered:

EXAMPLE I

Using apparatus of the type shown in Figure 1, benzene hexachloride is dehydrochlorinated under the following conditions whereby susbtantially complete decomposition of benzene hexachloride is achieved using a fluidized catalyst bed reactor 20 feet high and 4 feet in diameter (catalyst bed 10 feet high).

Benzene hexachloride feed rate _____ 625 lbs./hr.
Natural gas feed rate _____ 700–800 s.c.f.h.
Air feed (for combustion) _____ 0–15% excess.
Temperature of catalyst bed _____ 482° C.
Superficial velocity in fluidized bed ____ 0.5 ft./sec.
Fluidized catalyst _____ Humble #2.

Using the apparatus shown in Figure 1 introducing benzene hexachloride as a 40% slurry in trichlorobenzene, a series of runs are made using flue gas as a heat source and as a means to maintain catalyst fluidity in the reactor. By such a procedure, a high degree of benzene hexachloride decomposition is achieved. The conditions employed and the results obtained are tabulated in the following table:

*Product analysis*

| Ex. No. | BHC Feed (lbs./hr.) | Duration of Run (minutes) | Catalyst Bed Temp. (° C.) | Superficial Velocity (ft./sec.) | Bed Height | Dehydrochlorination Catalyst | Percent MCB | Percent DCB | Percent TCB [1] | Percent Heavy Ends [2] |
|---|---|---|---|---|---|---|---|---|---|---|
| 2 | 2.6 | 60 | 488 | 0.29 | 5 | None | 4.5 | 12.8 | 77.9 | 4.8 |
| 3 | 3.5 | 45 | 432 | 0.30 | 5 | FeCl$_3$ | 1.6 | 11.7 | 81.8 | 4.9 |
| 4 | 2.2 | 60 | 496 | 0.25 | 6 | CaO | 4.2 | 9.0 | 77.2 | 9.6 |
| 5 | 2.5 | 150 | 483 | 0.25 | 6 | CaO—8% excess air | 3.2 | 11.6 | 75.5 | 9.8 |
| 6 | 2.5 | 90 | 428 | 0.25 | 5½ | ____do____ | 1.5 | 12.8 | 74.8 | 10.9 |

[1] Includes TCB in slurry.
[2] Those materials boiling at temperatures greater than the boiling point of trichlorobenzene.

EXAMPLE VII

Using a molten benzene hexachloride feed, a run is made using no dehydrochlorination catalyst with the conditions employed and results obtained being as follows:

| Ex. No. | BHC Feed (lbs./hr.) | Duration of Run (minutes) | Catalyst Bed Temp. (° F.) | Superficial Velocity (ft./sec.) | Bed Height | Dehydrochlorination Catalyst | Percent MCB | Percent DCB | Percent TCB | Percent Heavy Ends |
|---|---|---|---|---|---|---|---|---|---|---|
| 7 | 6.0 | 60 | 424 | 0.22 | 5½ | | 1.5 | 25.9 | 55.5 | 17.1 |

It is to be understood that although the invention has been described with specific reference to particular embodiments thereof, it is not to be so limited, since changes and alterations therein may be made which are within the full intended scope of this invention as defined by the appended claims.

What is claimed is:

1. The method of dehydrochlorinating benzene hexachloride in a fluidized catalyst bed reaction zone in a vapor phase reaction which comprises introducing benzene hexachloride in liquid phase into a fluidized catalyst bed reaction zone maintained in a fluid state by uprising combustion gases, formed by burning combustible gases in a combustion zone adjacent said reaction zone and introducing the combustion gases therefrom directly into said reaction zone, said reaction zone being maintained at a temperature within the range from 300° to 550° C., and allowing sufficient residence time for said benzene hexachloride as a vapor phase in said reaction zone to effect the desired dehydrochlorination, and removing the dehydrochlorinated products from said zone.

2. The method of dehydrochlorinating benzene hexachloride in accordance with claim 1 which comprises vaporizing the benzene hexachloride in the presence of a mixture of ethylene dichloride and chlorine, thereby to supply at least a portion of the heat required for said dehydrochlorination from the exothermic reaction of chlorine and said ethylene dichloride, and allowing sufficient contact therewith to effect the desired dehydrochlorination.

3. The method of claim 1 wherein the benzene hexachloride introduced into said reaction zone is suspended in trichlorobenzene.

References Cited in the file of this patent
FOREIGN PATENTS
737,563    Great Britain _____ Sept. 28, 1955